United States Patent
Moseley et al.

(10) Patent No.: US 11,209,936 B2
(45) Date of Patent: Dec. 28, 2021

(54) NOISE MITIGATION FOR A FREQUENCY DOMAIN SENSOR

(71) Applicant: Tactual Labs Co., New York, NY (US)

(72) Inventors: Braon Moseley, Round Rock, TX (US); David Clark Wilkinson, Austin, TX (US)

(73) Assignee: Tactual Labs Co., New York, NY (US)

(*) Notice: Subject to any disclaimer, the term of this patent is extended or adjusted under 35 U.S.C. 154(b) by 68 days.

(21) Appl. No.: 16/052,766

(22) Filed: Aug. 2, 2018

(65) Prior Publication Data

US 2019/0042054 A1    Feb. 7, 2019

Related U.S. Application Data

(60) Provisional application No. 62/540,458, filed on Aug. 2, 2017.

(51) Int. Cl.
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/044* (2013.01)

(58) Field of Classification Search
None
See application file for complete search history.

(56) References Cited

U.S. PATENT DOCUMENTS

| | | | |
|---|---|---|---|
| 2010/0302203 A1* | 12/2010 | Tsuzaki | G06F 3/047 345/174 |
| 2011/0115729 A1* | 5/2011 | Kremin | G06F 3/0418 345/173 |
| 2013/0328823 A1* | 12/2013 | Liu | G06F 3/0418 345/174 |
| 2014/0022185 A1* | 1/2014 | Ribeiro | G06F 3/0412 345/173 |
| 2014/0092033 A1* | 4/2014 | Chang | G06F 3/0418 345/173 |
| 2015/0268794 A1* | 9/2015 | Yang | G06F 3/044 345/174 |
| 2016/0103525 A1* | 4/2016 | Snelgrove | G06F 3/0416 345/174 |
| 2017/0131829 A1* | 5/2017 | Takahashi | G06F 3/0412 |
| 2017/0205947 A1 | 7/2017 | Wigdor et al. | |

* cited by examiner

*Primary Examiner* — Matthew Yeung
(74) *Attorney, Agent, or Firm* — Adam Landa (57) ABSTRACT

Methods of mitigating noise in a FMT sensing system. Noise and touch events are identified in the system. Noise and touch events can be identified and determined to be aperiodic or periodic. After establishing the type of noise in the system. The frame rate or processing of frames can be adjusted in order to remove the noise during the processing of touch events.

13 Claims, 7 Drawing Sheets

NOISE MITIGATION FOR A FREQUENCY DOMAIN SENSOR

This application claims the benefit of U.S. Provisional Application Ser. No. 62/540,458, filed Aug. 2, 2017, entitled "Noise Mitigation for a Frequency Domain Sensor," the contents of which are hereby incorporated by reference.

FIELD

The disclosed systems and methods relate in general to the field of noise mitigation, and in particular to noise mitigation for a frequency domain sensor.

BRIEF DESCRIPTION OF THE DRAWINGS

The foregoing and other objects, features, and advantages of the disclosure will be apparent from the following more particular description of embodiments as illustrated in the accompanying drawings, in which reference characters refer to the same parts throughout the various views. The drawings are not necessarily to scale, emphasis instead being placed upon illustrating principles of the disclosed embodiments.

DETAILED DESCRIPTION

This application relates to the subject matter of U.S. Pat. No. 9,235,307 entitled "Fast Multi-Touch Stylus and Sensor"; U.S. Pat. No. 9,710,113 entitled "Fast Multi-Touch Sensor with User-Identification Techniques"; U.S. Pat. No. 9,830,001 entitled "Orthogonal Frequency Scan Scheme in Touch System"; U.S. Pat. No. 9,710,116 entitled "Frequency Conversion in a Touch Sensor"; U.S. patent application Ser. No. 15/099,179 entitled "Capacitive Sensor Patterns" and U.S. patent application Ser. No. 15/199,395 entitled "Signal Detection in Frequency Division Modulated Touch Systems"; U.S. patent application Ser. No. 15/926,278 entitled "Sensing Controller". Familiarity with these above-identified disclosures is assumed and the entire disclosures thereof are incorporated herein by this reference.

The present disclosure is directed to systems (e.g., objects, panels, displays or keyboards) sensitive to hover, contact and pressure and their applications in real-world, artificial reality, virtual reality and augmented reality settings. It will be understood by one of ordinary skill in the art that the disclosures herein apply generally to all types of systems using fast multi-touch sensors to detect hover, contact and pressure. In an embodiment, the present system and method can be applied to panels and display surfaces, including but not limited to smart boards, smart pads and interactive displays. In an embodiment, the present system and method can be applied to keyboards, including but not limited to membrane keyboards, dome-switch keyboards, scissor-switch keyboards, capacitive keyboards, mechanical-switch keyboards, buckling-spring keyboards, hall-effect keyboards, laser projection keyboards, roll-up keyboards, and optical keyboard technology.

Throughout this disclosure, the terms "touch", "touches", "touch event", "contact", "contacts", "hover", or "hovers" or other descriptors may be used to describe events or periods of time in which a key, key switch, user's finger, a stylus, an object, or a body part is detected by a sensor. In some sensors, detections occur only when the user is in physical contact with a sensor, or a device in which it is embodied. In some embodiments, and as generally denoted by the word "contact", these detections occur as a result of physical contact with a sensor, or a device in which it is embodied. In other embodiments, and as sometimes generally referred to by the term "hover", the sensor may be tuned to allow for the detection of "touches" that are hovering at a distance above the touch surface or otherwise separated from the sensor device and causes a recognizable change, despite the fact that the conductive or capacitive object, e.g., a finger, is not in actual physical contact with the surface. Therefore, the use of language within this description that implies reliance upon sensed physical contact should not be taken to mean that the techniques described apply only to those embodiments; indeed, nearly all, if not all, of what is described herein would apply equally to "contact" and "hover", each of which is a "touch" or "touch event." Generally, as used herein, the word "hover" refers to non-contact touch events or touch, and as used herein the term "hover" is one type of "touch" or "touch event" in the sense that "touch" is intended herein. Thus, as used herein, the phrase "touch event" and the word "touch" when used as a noun include a near touch and a near touch event, or any other gesture that can be identified using a sensor. "Pressure" refers to the force per unit area exerted by a user contact (e.g., presses by their fingers or hand) against the surface of an object. The amount of "pressure" is similarly a measure of "contact", i.e., "touch". "Touch" refers to the states of "hover", "contact", "pressure", or "grip", whereas a lack of "touch" is generally identified by signals being below a threshold for accurate measurement by the sensor. In accordance with an embodiment, touch events may be detected, processed, and supplied to downstream computational processes with very low latency, e.g., on the order of ten milliseconds or less, or on the order of less than one millisecond.

As used herein, and especially within the claims, ordinal terms such as first and second are not intended, in and of themselves, to imply sequence, time or uniqueness, but rather, are used to distinguish one claimed construct from another. In some uses where the context dictates, these terms may imply that the first and second are unique. For example, where an event occurs at a first time, and another event occurs at a second time, there is no intended implication that the first time occurs before the second time, after the second time or simultaneously with the second time. However, where the further limitation that the second time is after the first time is presented in the claim, the context would require reading the first time and the second time to be unique times. Similarly, where the context so dictates or permits, ordinal terms are intended to be broadly construed so that the two identified claim constructs can be of the same characteristic or of different characteristic. Thus, for example, a first and a second frequency, absent further limitation, could be the same frequency, e.g., the first frequency being 10 Mhz and the second frequency being 10 Mhz; or could be different frequencies, e.g., the first frequency being 10 Mhz and the second frequency being 11 Mhz. Context may dictate otherwise, for example, where a first and a second frequency are further limited to being frequency-orthogonal to each other, in which case, they could not be the same frequency.

The presently disclosed systems and methods provide for designing, manufacturing and using capacitive touch sensors, and particularly capacitive touch sensors that employ a multiplexing scheme based on orthogonal signaling such as but not limited to frequency-division multiplexing (FDM), code-division multiplexing (CDM), or a hybrid modulation technique that combines both FDM and CDM methods. References to frequency herein could also refer to other orthogonal signal bases. As such, this application incorporates by reference Applicants' prior U.S. Pat. No. 9,019,224, entitled "Low-Latency Touch Sensitive Device" and U.S. Pat. No. 9,158,411 entitled "Fast Multi-Touch Post Processing." These applications contemplate FDM, CDM, or FDM/CDM hybrid touch sensors which may be used in connection with the presently disclosed sensors. In such sensors, touches are sensed when a signal from a row is coupled (increased) or decoupled (decreased) to a column and the result received on that column.

This application also employs principles used in fast multi-touch sensors and other interfaces disclosed in the following: U.S. Pat. Nos. 9,933,880; 9,019,224; 9,811,214; 9,804,721; 9,710,113; and 9,158,411. Familiarity with the disclosure, concepts and nomenclature within these patents is presumed. The entire disclosure of those patents and the applications incorporated therein by reference are incorporated herein by reference. This application also employs principles used in fast multi-touch sensors and other interfaces disclosed in the following: U.S. patent application Ser. Nos. 15/162,240; 15/690,234; 15/195,675; 15/200,642, 15/821,677, 62/540,458, 62/575,005, 62/619,656 and PCT publication PCT/US2017/050547, familiarity with the disclosure, concepts and nomenclature therein is presumed. The entire disclosure of those applications and the applications incorporated therein by reference are incorporated herein by reference. Details of the presently disclosed sensors are described below.

Fast multi-touch sensors are a different type of touch technology when compared to capacitive touch controllers and sensors. While the fast multi-touch technology is interoperable with many sensors designed for capacitive based sensing, there are particular benefits of fast multi-touch that can be optimized by use of patterns and sensors. Utilization of frequency-orthogonal signals coupled with the use of patterns can result in superior interaction with devices that benefit from touch interactivity.

A change in the parameter or parameters used with fast multi-touch sensors can result in a change in the behavioral aspects of the system. Once a particular fast multi-touch application is identified the range of possible values and trade-offs for a particular application can be narrowed and subsequently prototyped and tested. Failing to have a deep understanding between the interactions between these parameters and the intended application can result in lengthy trial and error.

Generally, the sensors employed in the devices discussed herein comprise a transmitter and receiver of signals. In an embodiment, a mixed signal integrated circuit comprises signal generator, transmitter, receiver and signal processor. In an embodiment, the mixed signal integrated circuit is adapted to generate one or more signals and send the signals to transmit antennas. In an embodiment, the mixed signal integrated circuit is adapted to generate a plurality of frequency-orthogonal signals and send the plurality of frequency-orthogonal signals to the transmit antennas. In an embodiment, the mixed signal integrated circuit is adapted to generate a plurality of frequency-orthogonal signals and send one or more of the plurality of frequency-orthogonal signals to each of a plurality of rows. In an embodiment, the frequency-orthogonal signals are in the range from DC up to about 2.5 GHz. In an embodiment, the frequency-orthogonal signals are in the range from DC up to about 1.6 MHz. In an embodiment, the frequency-orthogonal signals are in the range from 50 KHz to 200 KHz. The frequency spacing between the frequency-orthogonal signals should be greater than or equal to the reciprocal of an integration period (i.e., the sampling period).

In an embodiment, the signal processor of a mixed signal integrated circuit (or a downstream component or software) is adapted to determine at least one value representing each frequency orthogonal signal transmitted to a row. In an embodiment, the signal processor of the mixed signal integrated circuit (or a downstream component or software) performs a Fourier transform to received signals. In an embodiment, the mixed signal integrated circuit is adapted to digitize received signals. In an embodiment, the mixed signal integrated circuit (or a downstream component or software) is adapted to digitize received signals and perform a discrete Fourier transform (DFT) on the digitized information. In an embodiment, the mixed signal integrated circuit (or a downstream component or software) is adapted to digitize received signals and perform a Fast Fourier transform (FFT) on the digitized information—an FFT being one type of discrete Fourier transform.

It will be apparent to a person of skill in the art in view of this disclosure that a DFT, in essence, treats the sequence of digital samples (e.g., window) taken during a sampling period (e.g., integration period) as though it repeats. As a consequence, signals that are not center frequencies (i.e., not integer multiples of the reciprocal of the integration period (which reciprocal defines the minimum frequency spacing)), may have relatively nominal, but unintended consequence of contributing small values into other DFT bins. Thus, it will also be apparent to a person of skill in the art in view of this disclosure that, the term orthogonal as used herein is not "violated" by such small contributions. In other words, as we use the term frequency orthogonal herein, two signals are considered frequency orthogonal if substantially all of the contribution of one signal to the DFT bins is made to different DFT bins than substantially all of the contribution of the other signal.

The general principles underlying the fast multi-touch sensors are discussed above and/or reference is made to where additional disclosure may be found regarding fast multi-touch sensors. Generally, in the systems described herein signals are transmitted and measurements are made at the receivers that reflect the amount of coupling that has occurred in the system due to touch events. A problem that may occur with the use of fast multi-touch sensors is that noise can interfere with the measurements that are made to determine touch events. Preferably, the noise that is identified is mitigated so that the measurements that are made by the system only reflect the touch events. Discussed below are methods and systems that may be employed with the use of FMT sensors that can mitigate the noise exhibited.

One way to mitigate the noise that may occur in the system is to adjust the time domain in order account for the noise. In the systems, a baseline reading may be established that reflects the signals that are transmitted and received by the system. The baseline that is established can be used to determine the amount of noise that may be present when signals are transmitted.

Figure 1:
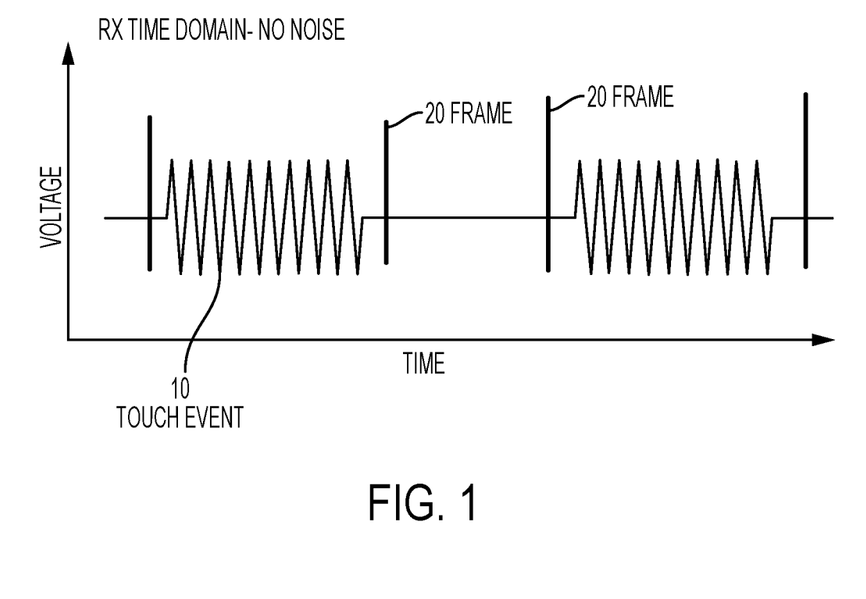
FIG. 1 is a diagram illustrating the signal received over time.

FIG. 1 is a diagram that illustrates the signals used in the determination of touch events. FIG. 1 shows the touch events 10 occurring within the frames 20. The frame 20 is the sampling time used in the system, e.g., the FMT sensor. The voltage that is measured reflects the coupling that has occurred in the system between transmitters and receivers due to a touch event 10. In an embodiment, received signals are sampled at at least 1 MHz. In an embodiment, received signals are sampled at at least 2 MHz. In an embodiment, received signals are sampled at 4 Mhz. In an embodiment, received signals are sampled at 4.096 Mhz. In an embodiment, received signals are sampled at more than 4 MHz.

To achieve kHz sampling, for example, 4096 samples may be taken at 4.096 MHz. In such an embodiment, the integration period is 1 millisecond, which per the constraint that the frequency spacing should be greater than or equal to the reciprocal of the integration period provides a minimum frequency spacing of 1 KHz. (It will be apparent to one of skill in the art in view of this disclosure that taking 4096 samples at e.g., 4 MHz would yield an integration period slightly longer than a millisecond, and not achieving kHz sampling, and a minimum frequency spacing of 976.5625 Hz.) In an embodiment, the frequency spacing is equal to the reciprocal of the integration period. In such an embodiment, the maximum frequency of a frequency-orthogonal signal range should be less than 2 MHz. In such an embodiment, the practical maximum frequency of a frequency-orthogonal signal range should be less than about 40% of the sampling rate, or about 1.6 MHz. In an embodiment, a DFT (which could be an FFT) is used to transform the digitized received signals into bins of information, each reflecting the frequency of a frequency-orthogonal signal transmitted which may have been transmitted by the transmit antenna 130. In an embodiment 2048 bins correspond to frequencies from 1 KHz to about 2 MHz. It will be apparent to a person of skill in the art in view of this disclosure that these examples are simply that, exemplary. Depending on the needs of a system, and subject to the constraints described above, the sample rate may be increased or decrease, the integration period may be adjusted, the frequency range may be adjusted, etc.

In an embodiment, a DFT (which can be an FFT) output comprises a bin for each frequency-orthogonal signal that is transmitted. In an embodiment, each DFT (which can be an FFT) bin comprises an in-phase (I) and quadrature (Q) component. In an embodiment, the sum of the squares of the I and Q components is used as a measure corresponding to the signal for that bin. In an embodiment, the square root of the sum of the squares of the I and Q components is used as a measure corresponding to the signal for that bin. It will be apparent to a person of skill in the art in view of this disclosure that a measurement corresponding to the signal for a bin could be used as a measurement related to touch. In other words, the measurement corresponding to the signal in a given bin would change as a result of a touch event. Furthermore, while signal strength is a factor that can be used, phase can also be used in order to obtain meaningful information about a touch.

Still referring to FIG. 1, the touch events 10 (illustrated by the symmetrical up and down movement of the line) occurring within the frames 20 do not exhibit any noise. It should be understood that the touch event 10 shown in this manner is for illustrative purposes only. This would be a situation where no steps would have to be taken since there is no observable noise in the system.

Figure 2:
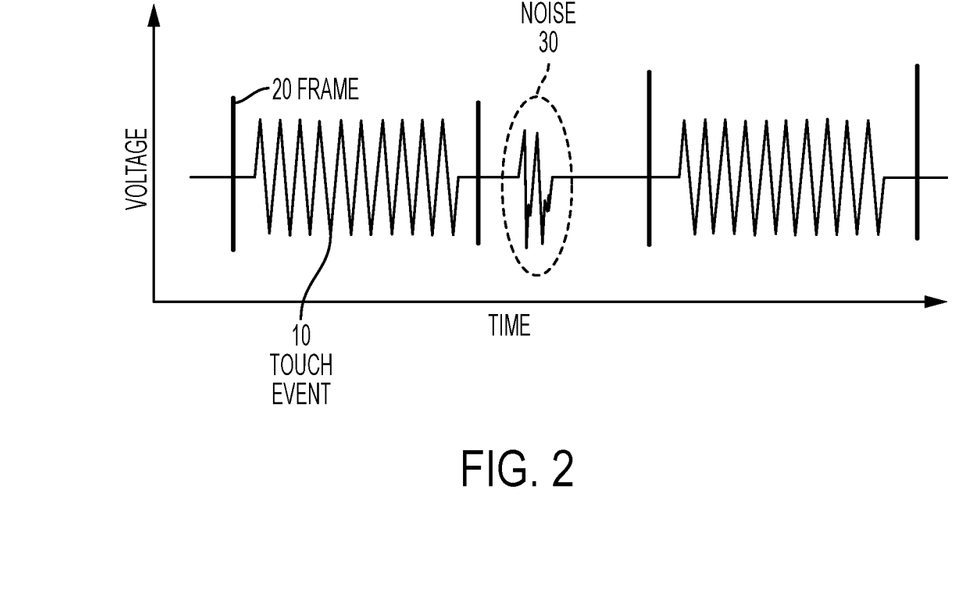
FIG. 2 is a diagram illustrating the signal received over time with noise in the transmitted signal.

FIG. 2 is another diagram illustrating signal received over time. In the diagram of FIG. 2, frames 20 and touch events 10 are shown. In addition to the touch events 10, there is noise 30 occurring within the system. The noise 30 is shown as activity in the signal that is not indicative of touch event 10. It should be understood that noise 30 is any feature in the system that interferes with the signal regardless of whether or not the signal is indicative of a touch event 10 or whether or not it occurs within a frame 20. The noise 30 that is shown in FIG. 2 does not occur within the frames 20. Since the noise 30 that is occurring does not interfere with the touch events 10, the noise 30 can be effectively ignored.

In the circumstance shown in FIG. 2, the noise 30 that is occurring may be periodic or aperiodic. So long as the noise 30 is not occurring within the touch events 10, the noise 30 can be effectively ignored.

Figure 3:
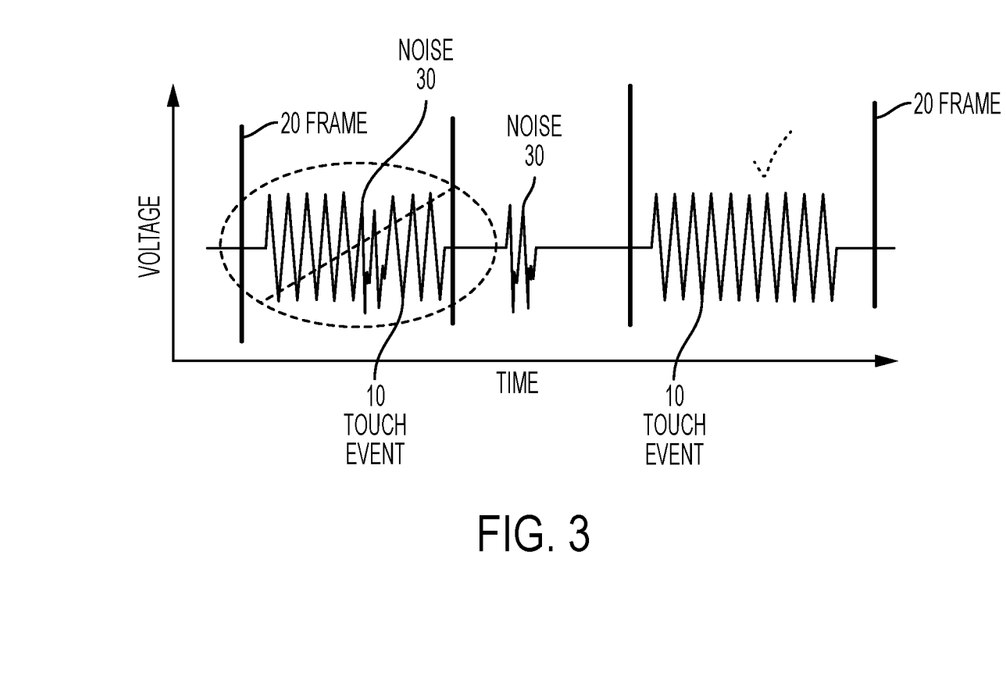
FIG. 3 is a diagram illustrating one method for removing aperiodic noise within the signal.

FIG. 3 is a diagram illustrating one method for removing aperiodic noise within the signal. The diagram shown in FIG. 3 shows that noise 30 occurring within the system occasionally occurs within the frames 20. When the noise 30 that is occurring does not interfere with the touch events 10, then the noise 30 can be effectively ignored. In the circumstance where the noise 30 occurs within a frame 20, that frame 20 can be dropped. In this situation, only frames 20 that do not have noise within the frame 20 are used.

Typically, the method shown in FIG. 3 is used with noise 30 that occurs aperiodically. Noise 30 that is "aperiodic" is noise that occurs at intervals that may not be readily predictable, irregular or at intervals that do not repeat in a meaningful time frame for the system.

With this method for mitigating the noise 30 in the system, signals are first received at a receiver over a period of time. These signals are used to establish a baseline reading of the received signals over a period of time. Using the baseline reading, noise 30 and touch events 10 can be identified. The system can then identify and determine if the noise 30 that is occurring is aperiodic or periodic. When the noise 30 that is detected is determined to be aperiodic, those subsequent future frames 20 that contain noise 30 can be deleted or otherwise ignored when utilizing the touch events 10 in the subsequent processing of the touch events 30 by the system. That is to say, those frames 20 in which noise 30 is identified can be discarded by the system and only those frames 20 that are free from noise 30 can be used in the processing and subsequent utilization of the touch events 10 by the system.

In an embodiment, the frames 20 with noise 30 are ignored in subsequent processing of the touch events 10. In an embodiment, meaningful touch event information is extracted from the frames 20 that have noise 30 and stored as backup information or cross-check information. In an embodiment, frames 20 that have noise 30 are analyzed and used in order to better identify future noise 30 that is aperiodic in the frames 20.

Figure 4:
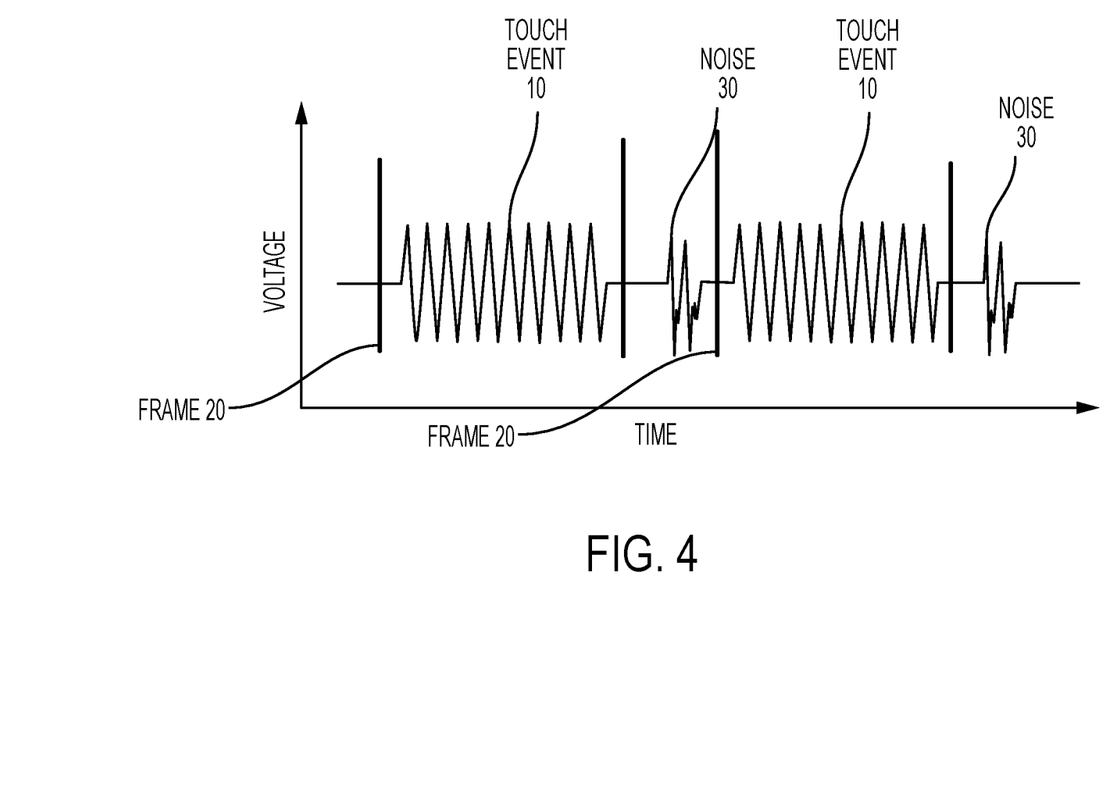
FIG. 4 shows a method for avoiding periodic noise within the signal.

FIG. 4 shows a method for avoiding noise 30 that is periodic within the received signals. By "periodic" it is meant that the noise 30 occurs at regular intervals. These intervals are predictable and therefore can be compensated for by the system.

FIG. 4 shows that the frames 20 containing the touch events 10 occur at times that avoid the noise 30. This is accomplished by determining that the noise 30 that is occurring is periodic and subsequently adjusting or altering the size and/or the taking of frames 20 so that that the timing of the frames 20 avoids the noise 30. In an embodiment, the frame size is decreased to avoid the noise 30. In an embodiment, timing of the taking of the frame 20 is change.

With this method for mitigating and avoiding the noise 30 in the system, signals are first received at a receiver over a period of time. These signals are used to establish a baseline reading of the received signals over the period of time. Using the baseline reading, noise 30 and touch events 10 can be identified in the received signal. The system can then determine if the noise 30 that is occurring is aperiodic or periodic. The system can then adjust the timing of future frames 20 so that the periodic noise 30 does not occur in the frames 20 to identify touch events 10.

Figure 5:
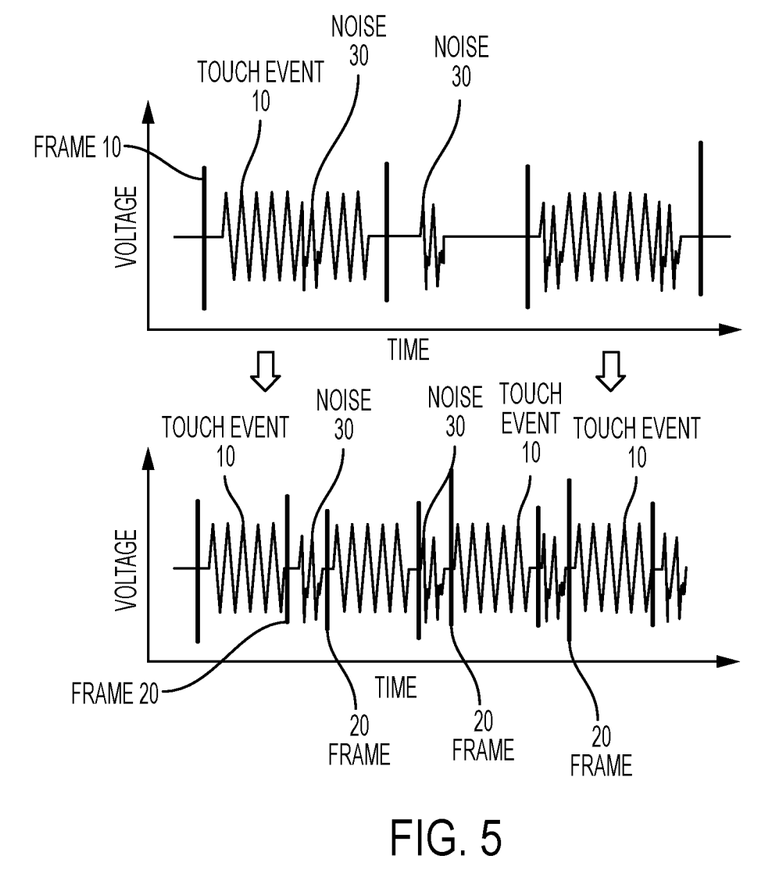
FIG. 5 shows a method for avoiding noise within the signal that repeats faster than a full frame time capture.

FIG. 5 shows a variation of what is shown in FIG. 4. In FIG. 5, the noise 30 is occurring at periodic intervals that fall within the timing of the frames 20 that are typically used by the system. Since the noise 30 occurs within the timing of the frames 20 that are usually used, in order to compensate for the noise 30 the frames 20 are taken over shorter intervals so that the noise 30 can be avoided. The system then takes the touch events 10 found in frames 20 without noise 30 to use in the system for subsequent processing.

While the methods discussed above are discussed in terms of periodic and aperiodic noise, it should be understood that a system can combine the methodologies and effectively employ both methodologies for mitigating noise in the time domain to address situations where both periodic and aperiodic noise is occurring. In other words, multiple applications of the methods discussed herein can be used within the same system in order to provide noise-free touch events for the system.

Figure 6:
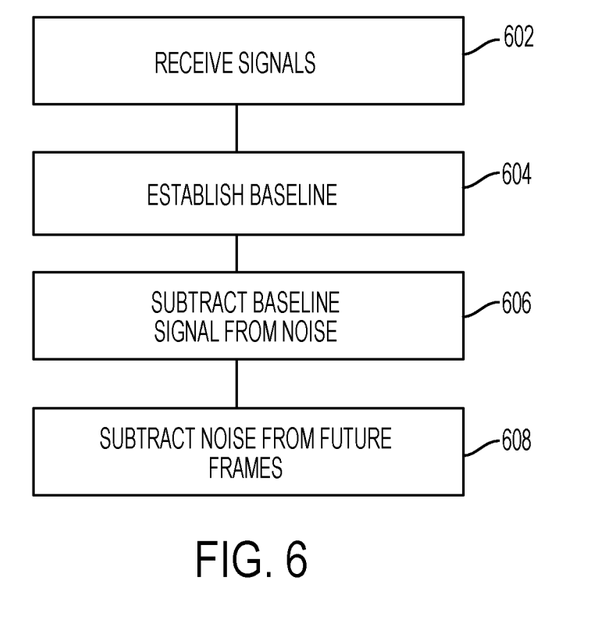
FIG. 6 is a flowchart showing the steps used in mitigating noise in a touch event.

Referring now to FIG. 6, another method for mitigating noise in the system is disclosed and illustrated by the flowchart. In step 602, signals are received in the system. In step 604, a baseline is established. This can be done for each receiver in the system. For example, time domain samples can be taken for each receiver and averaged over time. For example, in an embodiment, 100 frames can be taken at each receiver and used to establish what a baseline time domain signal looks like for each of the receivers in the system.

In step 606, the baseline signals are subtracted from the signals received at the system in order to establish the noise in the system. The steps set forth in steps 602-606 to identify noise can also be used with the systems and methods discussed elsewhere within the application. Touch events near or at some of the receivers can be identified and analyzed to determine the amount of noise that may occur near receivers proximate to the touch events but not involved in the touch event. By subtracting the baseline from signal now received, the noise can be established.

In step 608, as new frames come in, the noise is subtracted leaving only frame to baseline differences. Thus, when a FFT is performed on the time domain delta, the resultant heat map should be the same as the baselined heat map, with no signal where there isn't a touch event and only values where there is a touch event. The signals received at the touch event may be more readily identifiable since noise has been removed from the system. This method of identifying and subtracting noise from future signals can be used in conjunction with the other methods and systems discussed above in order to address all potential occurrences of noise with respect to the FMT sensors discussed herein.

Figure 7:
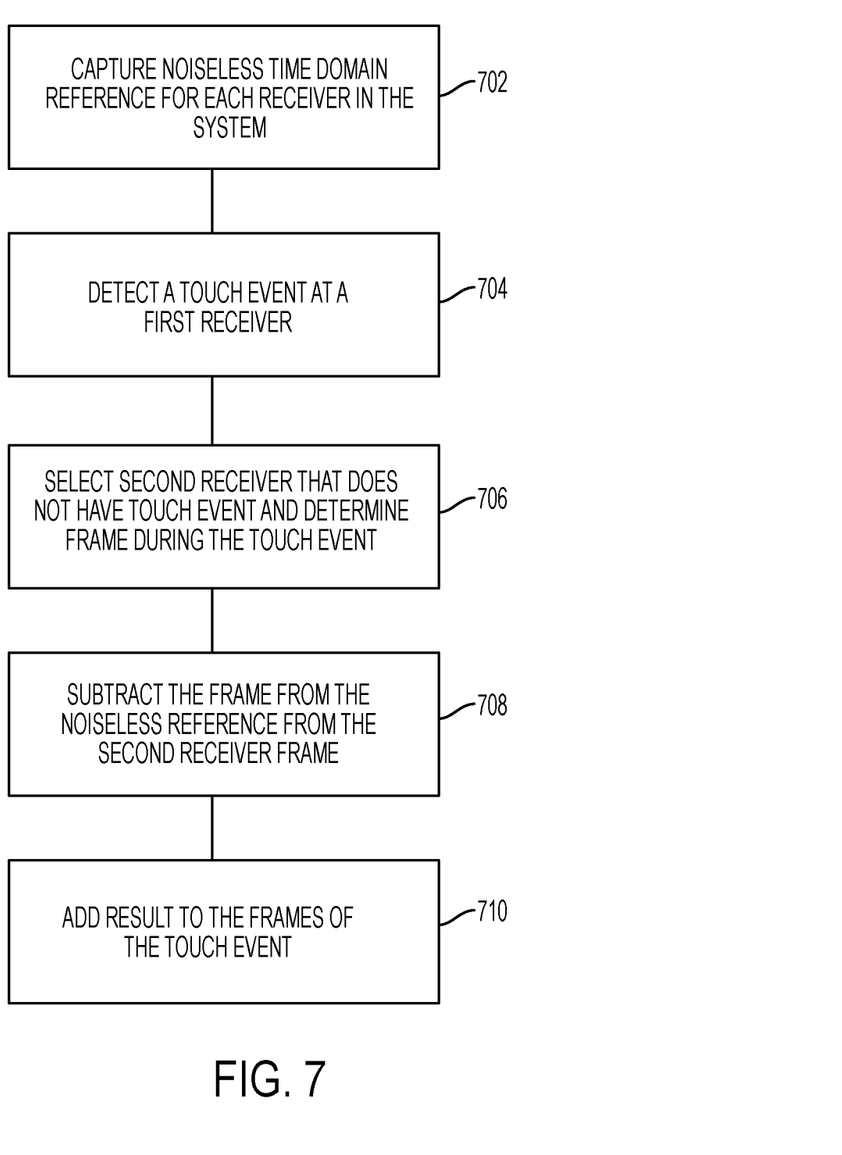
FIG. 7 is another flowchart showing the steps used in mitigating noise in a touch event.

Another method for providing time domain noise mitigation comprises the following steps. In step 702, a noiseless time domain reference is taken for each receiver in the system. This establishes a baseline reading for the system. So for example, for a display the touch controller is powered. No other system in the display is powered when the display is powered. After the touch controller is powered, N time domain frames for each receiver is taken. So for example 2048 sample time domain frames are captured for each of the receivers in the display. The N time domain frames are averaged or smoothed in order to create a reference frame for each receiver in the system.

During step 704, as part of the normal operation of the display a touch event is detected at a first receiver. So for example, a potential touch event is detected at one of the receivers of the display.

During step 706, a second receiver that does not have a possible touch event is selected and a frame is taken at the second receiver during that touch event. The second receiver selected is a nearby neighbor. So for example, a receiver that is one to five receivers away (so for example if the receiver detecting the touch event is receiver 67 the neighbor receiver may be receiver 64.) The neighbor selected preferably does not display any possible touch events.

During step 708, the frame taken from the second receiver is subtracted from the reference frame for the second receiver (i.e. the baseline reading established previously). So for example, the frame taken from receiver 64 is subtracted from the reference frame for the receiver 64. The result is an approximation of the time domain noise environment common to the first receiver due to close proximity. Because the result of the calculation is the result of the subtraction of the frame taken from the second receiver subtracted from the reference frame for the second receiver the result is a negative number.

During step 710, the results of the subtraction are added to the frames of the touch event. That is to say the resultant frame taken from the subtraction of the second frame from the reference frame from the second receives is used to modify the touch event data taken at the first receiver. So for example, if the touch event is at receiver 67, the results taken from the receiver 64 are added to the frames at receiver 67 in order to produce a reduced noise version of the original time domain frame taken at 67. The mitigated touch frame data is then used to process this information and produce touch event results that are less noisy.

The several embodiments discussed above illustrate a variety of methods for mitigating noise within the touch panel, but are not intended to limit the scope of the claims. Other variations of the method will become apparent to persons of skill in the art in view of this disclosure, and are thus included within the scope of this disclosure.

An embodiment of the disclosure is a method for mitigating noise in a system. The method comprises receiving frequency orthogonal signals at a plurality of receivers over a period of time; establishing a baseline reading of the received frequency orthogonal signals for the plurality of receivers over the period of time; identifying noise and touch events that occur over a plurality of frames based on the established baseline reading of the received frequency orthogonal signals; determining that the noise that occurs over the plurality of frames is aperiodic noise; and adjusting the taking of future frames so that future frames having touch events and the aperiodic noise are avoided in processing touch events.

Another embodiment of the disclosure is a method for mitigating noise in a system. The method comprises receiving frequency orthogonal signals at a plurality of receivers over a period of time; establishing a baseline reading of the received frequency orthogonal signals for the plurality of receivers over the period of time; identifying noise and touch events that occur over a plurality of frames based on the established baseline reading of the received frequency orthogonal signals; determining that the noise that occurs over the plurality of frames is periodic noise; and adjusting the timing of future frames so that the periodic noise does not occur in frames used to process touch events.

Still yet another embodiment of the disclosure is a method for mitigating noise in a system. The method comprises receiving frequency orthogonal signals at a plurality of receivers over a period of time; establishing a baseline reading of the received frequency orthogonal signals over the period of time; identifying noise occurring in the system based on the established baseline reading of the received frequency orthogonal signals over the period of time; subtracting the established baseline reading of the received frequency orthogonal signals from the identified noise occurring in the system, thereby leaving noise by itself; and subtracting the noise from future frames used to process touch events by the system.

Another embodiment of the disclosure is a method for mitigating noise in a system. The method comprises receiving frequency orthogonal signals at a plurality of receivers over a period of time; establishing a baseline reading of the received frequency orthogonal signals over the period of time for each of the plurality of receivers; detecting a touch event at a first receiver of the plurality of receivers and capturing a first frame of data from the first receiver; selecting a second frame of data from a second receiver of the plurality of receivers, wherein the second frame of data is taken during the touch event; subtracting the second frame of data from the baseline reading of the second receiver to produce a resultant frame; and adding the resultant frame to frames taken at the first receiver to mitigate noise at the first receiver.

While the invention has been particularly shown and described with reference to a preferred embodiment thereof, it will be understood by those skilled in the art that various changes in form and details may be made therein without departing from the spirit and scope of the invention.

The invention claimed is:

1. A method for mitigating noise in a system, comprising:
receiving a plurality frames, each frame being received by receiving a plurality of frequency orthogonal signals at a plurality of receivers over a period of time, wherein each of the plurality of frequency orthogonal signals is orthogonal to each other of the plurality of frequency orthogonal signals;
establishing a baseline from a plurality of frames;
for each of a plurality of successive frames:
using the baseline determining whether noise is present in the frame;
where noise is present in a frame, discarding the frame;
where noise is not present in a frame, using the frame to determine touch events.

2. The method of claim 1, wherein the noise is aperiodic.

3. The method of claim 1, wherein the noise is periodic.

4. The method of claim 1, determining a second timing for at least some of the plurality of successive frames to avoid noise that is periodic.

5. A method for mitigating noise in a system, comprising:
receiving a plurality frames at a first timing, each frame being received by receiving one or more frequency orthogonal signals at each of a plurality of receivers over a period of time, wherein each of the frequency orthogonal signals is orthogonal to each other of the frequency orthogonal signals;
establishing a baseline reading from the plurality of frames;
receiving another plurality frames at the first timing, each frame being received by receiving a plurality of frequency orthogonal signals at a plurality of receivers over a period of time, wherein each of the plurality of frequency orthogonal signals is orthogonal to each other of the plurality of frequency orthogonal signals;
using the baseline to determine whether periodic noise is present in the another plurality of frames;
determining a second timing so that the periodic noise does not occur in the frames; and
receiving a further plurality of frames at the second timing to determine touch events.

6. The method of claim 5, further determining whether aperiodic noise is present.

7. The method of claim 6, wherein when aperiodic noise is present, discarding frames with the aperiodic noise.

8. The method of claim 5, receiving another further plurality of frames at a third timing so that additional periodic noise does not occur in the further plurality of frames.

9. The method of claim 8, wherein the third timing is different than the second timing.

10. A method for mitigating noise in a system, comprising:
establishing a reference frame for each of a plurality of receivers;
receiving a frame for each of the plurality of receivers;
determine a difference between the frames for each of the plurality of receivers and the reference frame; and
remove the difference from subsequent frames, thereby mitigating noise in the subsequent frames.

11. A method for mitigating noise in a system, comprising:
establishing a reference frame for each of a plurality of receivers;
receiving a frame for each of the plurality of receivers;
identifying in the frame a potential touch event at a first receiver;
selecting a nearby neighbor receiver to the first receiver;
determine a difference between the frame for the nearby neighbor receiver and the reference frame for the nearby neighbor receiver; and
remove the difference from the potential touch event at the first receiver prior to identifying a touch event in the frame for each of the plurality of receivers.

12. The method of claim 11, wherein the nearby neighbor is between one to five receivers sway from the first receiver.

13. The method of claim 11, wherein the nearby neighbor receiver does not have a potential touch event.

* * * * *